United States Patent [19]

St-Hilaire

[11] Patent Number: 4,744,402
[45] Date of Patent: May 17, 1988

[54] TIRE INFLATING APPARATUS

[76] Inventor: Germain St-Hilaire, 3578 Avenue Royale, St. Fereol des Neiges, Que, Canada

[21] Appl. No.: 889,851

[22] Filed: Jul. 28, 1986

[51] Int. Cl.$^4$ .............................................. B60C 25/00
[52] U.S. Cl. .................................... 157/1.1; 157/1.24; 157/16
[58] Field of Search .................... 157/14, 16, 21, 1.1, 157/1.0, 1.2, 1.22, 1.24, 1.26, 1.28, 1.17; 137/561 A

[56] References Cited

U.S. PATENT DOCUMENTS

| | | |
|---|---|---|
| 3,675,705 | 7/1972 | Corless . |
| 3,786,852 | 1/1974 | Houston . |
| 3,789,901 | 2/1974 | Rishovd . |
| 3,851,695 | 12/1974 | Kimberly ............................ 157/1.1 |
| 4,061,173 | 12/1977 | Daly . |
| 4,245,686 | 1/1981 | Holladay . |
| 4,263,958 | 4/1981 | Corless ................................ 157/1.1 |

FOREIGN PATENT DOCUMENTS

| | | |
|---|---|---|
| 931491 | 8/1973 | Canada . |
| 1001542 | 12/1976 | Canada . |
| 1020449 | 11/1977 | Canada . |
| 1089753 | 11/1980 | Canada . |

OTHER PUBLICATIONS

CP/Coats Catalog—Machine Model RC-5A.
CP/Coats Catalog—Machine Model RC-10A.
AMMCO Catalog—Machine Model 740 Tire Changer.

Primary Examiner—Debra Meislin
Attorney, Agent, or Firm—Cushman, Darby & Cushman

[57] ABSTRACT

The present invention relates to a pneumatic device for seating tire beads on the rim portions of a wheel of a vehicle. The device includes a header attached to the rotating table of a tire changing machine and which supports a wheel and a tire assembly. A plurality of upwardly extending conduits direct air from the header to the interface between a bead of a tire and the corresponding rim portion of the wheel which are adjacent the top surface of the table. The pneumatic device also includes a system for immobilizing the table during the operation of the device for seating tire beads.

12 Claims, 2 Drawing Sheets

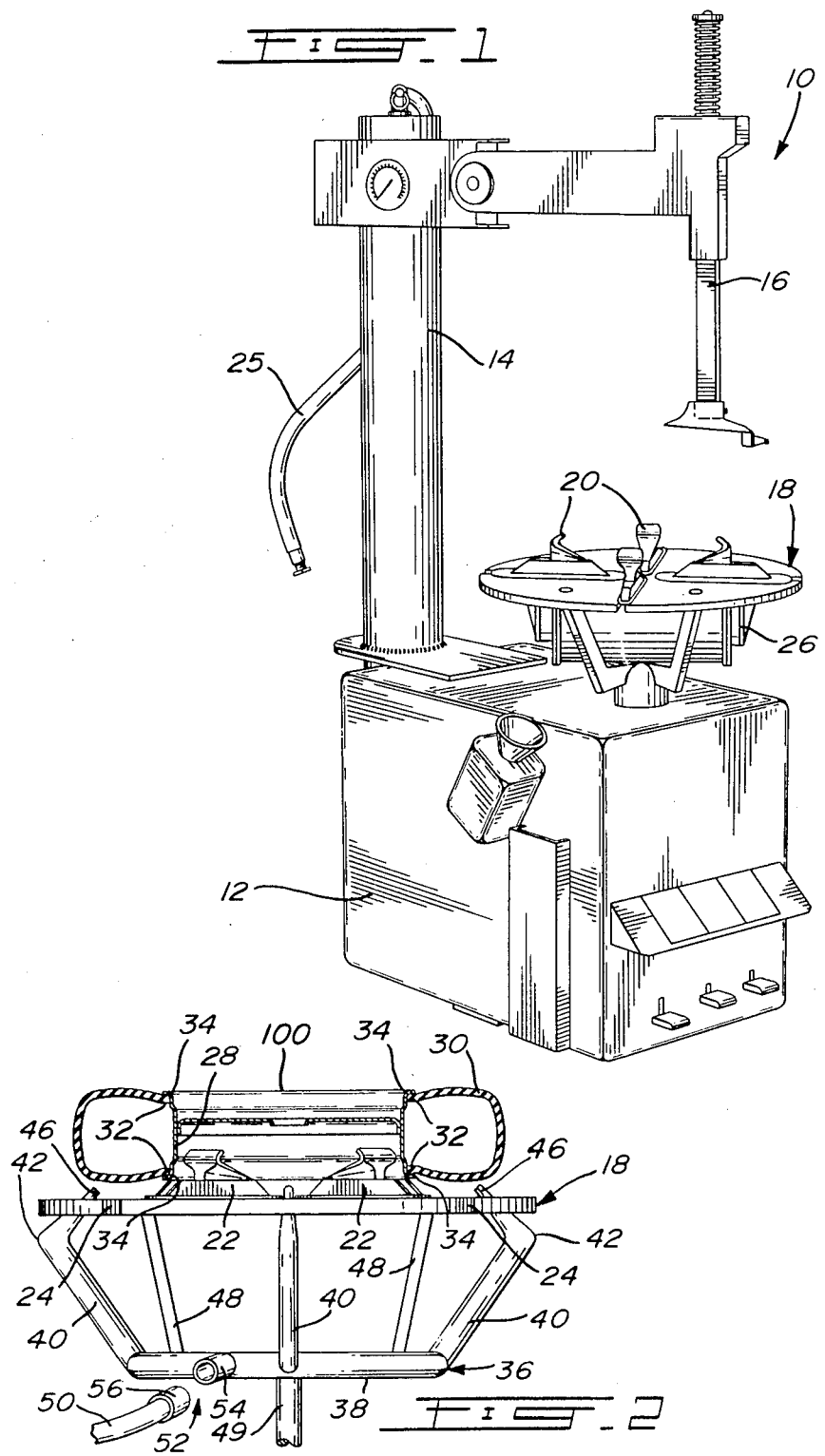

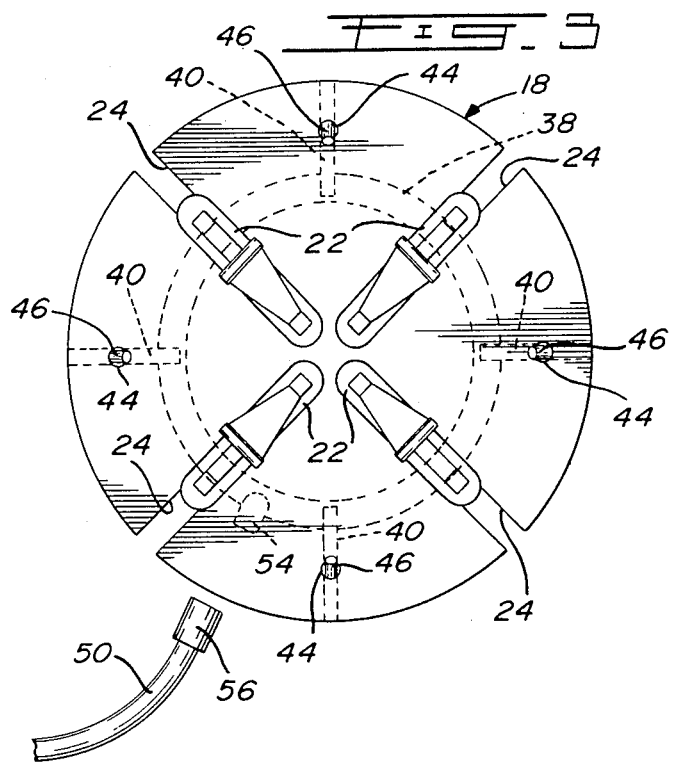
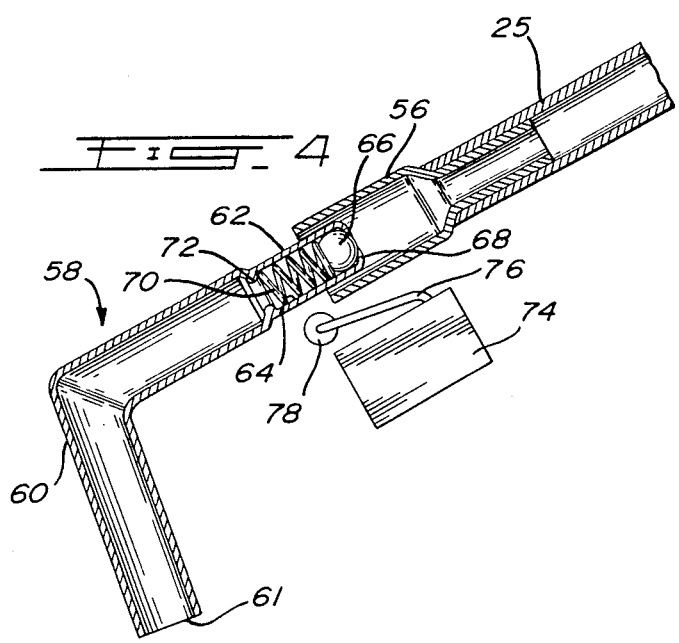

TIRE INFLATING APPARATUS

FIELD OF THE INVENTION

The present invention relates to tire servicing equipment and more specifically to a device for seating the beads of a tubeless tire onto the rims of a wheel.

BACKGROUND OF THE INVENTION

Machines for servicing tires are generally well known devices. A typical machine comprises a mechanical system which clamps the wheel on a supporting structure and then, a tire changing tool removes or installs the tire on the wheel. The mechanical system for clamping the wheel includes a vertical treaded rod extending through the central opening of the wheel and receiving a large nut pressing down the wheel on the supporting structure.

Such tire changing machines are, however, unable to service tires on wheels without a central opening. Therefore, in the recent years, manufacturers of tire servicing equipment have developed universal tire changing machines which operate according to a different principle. Such machines includes a rotatable table, driven by an electric motor or by a pneumatic system, and carrying a plurality of movable clamping jaws which engage the inner wall of the wheel to hold it on the table. During a tire servicing operation, a rotational movement is imparted to the table while a stationary tire changing tool dismounts or mounts the tire on the wheel.

During the installation of a new tire, the first operation is to loosely mount the tire on the wheel by using the tire changing tool. Subsequently, compressed air is injected through the valve of the wheel to seat the tire beads against the rim portions of the wheel and inflate the tire.

With the increasing popularity of low profile radial tires with more rigid sidewalls, problems have been experienced for seating the beads of these tires to the rims of the wheel. To overcome these problems, different air injection systems have been desiged to be mounted on the rotatable table for injecting air through a plurality of discharge nozzles, at a substantially high pressure, between the interface of the tire bead and the rim of the wheel, which are adjacent to the top surface of the table. These systems, however, have not been very successful and their practical implementation has been rather limited for a number of reasons. One of these reasons is that they are too costly to manufacture and also they are of such design that they constitute a very tortuous path for the compressed air, substantially reducing its pressure at the discharge nozzles.

OBJECTS AND STATEMENT OF THE INVENTION

It is an object of this invention to provide an improved device for seating beads of a tubeless tire into the rims of wheel.

Another object of this invention is a tire changing machine which comprises an improved device for seating tire beads of a tubeless tire onto the rim portions of a wheel.

The device for seating tire beads according to this invention comprises a header having preferably an annular shape and attached to the rotating table. A plurality of conduits, in fluid comunication with the header, extend upwardly therefrom and define air discharge nozzles at their upper ends, received in openings drilled in the table. The cross-sectional area of each conduit, in its upper portion gradually and smoothly diminishes toward the discharge nozzle to increase the velocity of the air emanating from the nozzle.

Compressed air is directed from a compressed air source to the header, through preferably, a flexible hose having one end permanently connected to the compressed air source and an opposite end connected to the header by a quick connect-disconnect coupling.

The header and the conduits define an air injection system which is free flowing, a relative term indicating that the air injection system offers little resistance to the passage of a sudden jet of a relatively high volume of air therethrough.

During the operation of the device for seating tire beads, the table should be prevented from rotating since the header is connected to the flexible hose. An accidental actuation of the table may tear the flexible hose resulting in an escape of highly compressed air and creating a safety hazard for the operator of the machine.

To prevent an accidental rotation of the table and consequently of the header which is attached thereto, the device for seating tire beads includes a system which deactivates the drive mechanism of the table when the flexible hose is connected to the header.

In one embodiment, a holder for the flexible hose is mounted to the machine and it is provided with a momentarily acting switch which closes its contacts when the hose is received in the holder. When the hose is removed from the holder, the switch assumes its normal position and opens its contacts. When the table is driven by an electric motor, the switch may be connected in series with the electric motor to open the power supply circuit of the motor when the hose is removed from the holder.

When the tire changing machine is fully air operated the switch may be used to control a bleed valve preventing a build up of pressure in the air cylinder driving the table.

The device for seating tire beads has been designed to fit a variety of already existing tire changing machines. The device may be made available commercially as a kit including the header to which are welded the upwardly extending conduits, the hose holder and the switch to be connected to the drive system of the table and an instructions manual.

Therefore, the present invention comprises an assembly for seating beads of a tubeless tire onto the rims of a wheel, the tire including a pair of spaced apart beads which are to be seated on corresponding spaced apart rim portions formed on the wheel, the assembly being adapted to be mounted on a tire changing machine of the type comprising a rotatable table actuated by a driving system, the table having a top surface on which the wheel is supported, the tire changing machine further comprising clamp means mounted on the table and being movable thereon between a wheel release position and a wheel retaining position wherein the clamp means firmly engages the inner wall of the wheel to firmly hold the wheel on the table, the assembly including:

a header adapted to be connected to a source of compressed air, the header being adapted to be attached to the table at a level below the table; and a plurality of elongated conduits, each conduit extending upwardly and having an end connected to the header and an opposite end passing through an opening in the table and defining an air discharge nozzle, the air discharge nozzle being adapted to inject air toward the interface between a bead of the tire and the corresponding rim portion of the wheel which are adjacent to the top surface for seating both tire beads on their respective rim portions of the wheel.

This invention further comprises a tire changing machine, including:

a supporting structure;

a rotatable table comprising a plurality of openings and being mounted on the supporting structure, the table having a top surface for supporting a wheel of a vehicle thereon;

clamp means mounted on the table and being movable between a wheel release position and a wheel clamping position wherein the clamp means is adapted to firmly engage the inner wall of a wheel to secure the wheel on the table;

tire changing tool means mounted on the supporting structure;

a device for seating tire beads of a tubeless tire on the rims of a wheel, the tire including a pair of spaced apart beads which are to be seated on corresponding spaced apart rim portions formed on the wheel during the installation of the tire on the wheel, the device including:

(a) a header adapted to be connected to a source of compressed air, the header being secured to the table at a level below the table; and (b) a plurality of elongated conduits, each conduit extending upwardly and having an end connected to the header and an opposite end passing through an opening in the table and defining an air discharge nozzle, the air discharge nozzle being substantially at the level of the top surface and being adapted to inject air toward the interface between a bead of the tire and a corresponding rim portion of the wheel which are adjacent to the top surface for seating both tire beads on their corresponding rim portions of the wheel, the header and the conduits being free flowing and offering little resistance to the passage therethrough of a sudden jet of air.

BRIEF DESCRIPTION OF THE DRAWINGS

A preferred embodiment of this invention will now be described with reference to the annexed drawings, in which:

FIG. 1 is a perspective view of a tire changing machine;

FIG. 2 is a side view of the rotatable table of the machine shown in FIG. 1, to which is mounted an air injection system for seating tire beads and a wheel and a tire assembly, shown in cross-section;

FIG. 3 is a top view of the rotatable table shown in FIG. 2 some elements being omitted;

FIG. 4 is a schematic cross-sectional view of a holder assembly for carrying a flexible compressed air hose.

DESCRIPTION OF A PREFERRED EMBODIMENT

The tire changing machine 10 shown in Figure 1, includes a supporting structure 12 from which extends upwardly a vertical column 14. Colomn 14 carries at one end thereof a pneumatic tire changing tool 16, well known in the art. A rotatable table 8 is mounted on structure 12 and comprises a wheel clamping device 20 actuated by an air cylinder 26. As it is customary in the art, machine 10 is provided with a surge tank (not shown) for compressed air fed by a conventional air compressor. A flexible air hose 25 has one end permanently connected to the tank and it is used for seating tire beads.

Table 18 is driven by an electric motor (not shown) operated with foot pedal controls and may be rotated by the operator clockwise or counterclockwise, as desired.

With reference to FIG. 2 and 3, the wheel clamping device 20 includes four radially movable clamps 22 which are mounted on rotatable table 18 and slide in radially extending slots 24.

The tire changing machine 10 includes an air injection device 36 comprising an annular header 38 from which extend upwardly a plurality of conduits 40, in fluid communication with header 38. Conduits 40 extend upwardly and radially outwardly with respect to header 38. At a certain level, between header 38 and table 18, conduits 40 make a right angle bend as at 42, toward table 18. The upper end of each conduit 40 passes through an opening 44, drilled in table 18, and defines an air injection nozzle 46, substantially at the level of the top surface of table 18.

The cross-sectional area of each conduit diminishes gradually and smoothly, in the upper end region thereof, toward the nozzle 46 for increasing the velocity of the air emanating from the nozzle.

Annular header 38 is mounted below table 18 and it is secured to four brackets 48 (only two being shown) supporting the table 18 on a rotatable shaft 49 which drives the table.

For certain applications, a polygonal shape for header 38 is more appropriate since it facilitates the attachment of the header to the brackets 48 supporting the table.

Compressed air is delivered from the compressed air tank of the tire changing maschine to header 38 by means of the flexible hose 25 connected to header 38 by a quick connect/disconnect coupling 52. Coupling 52, well known in the art, is commercially available and includes a male member 54 mounted to header 38 and a female member 56 attached to hose 50. Such quick release couplings typically comprise a detent mechanism to hold the female and the male members interconnected against an unwanted retraction of the female member 56 from the male member 54. However, when a sufficient retractive force is applied to female member 56 to overcome the locking strength of the detent mechanism, hose 50 will be disconnected from the header 38.

Referring to FIG. 4, a holder assembly 58 for the flexible air hose 25 is mounted to the tire changing machine 10. The position of the holder assembly 58 is not critical and the choice of its location on the machine 10 is governed mainly by considerations of practical or aestetical nature.

Holder assembly 58 comprises an elbow shaped conduit 60 comprising a downwardly directed discharge opening 61 and a nipple 62 adapted to receive the female member 56, to which is attached the flexible air hose 25, of coupling 52. Nipple 62 preferably comprises a detent mechanism (not shown) to prevent an unwanted retraction of the female member 56 from holder assembly 58. Such a detent mechanism is well known in the art and may comprise a plurality of spring loaded balls mounted on the female member 56 engaging an annular groove formed on the outer surface of nipple 62.

Nipple 62 includes an internal cylindrical opening 64 closed by a steel ball 66 urged toward an annular ridge 68, formed at the mouth of opening 64, by a helicoidal spring 70. Spring 70 is held in place between the steel ball 66 and an annular protrusion 72 formed within conduit 60.

As an example, nipple 62 may be constructed from a male member 54 of a coupling 52, which has been modified to receive spring 70 and steel ball 66 and attached, by any appropriate means to elbow shaped conduit 60.

A momentarily acting switch 74 is mounted to the tire changing machine 10, adjacent nipple 62. Switch 74 comprises an actuator 76, provided at one end thereof with a roller 78 engaging the female member 56 of coupling 52.

When female member 56 is retracted from nipple 62, actuator 76 assumes its normal position, as shown in FIG. 4, the contacts of switch 74 being therefore in the opened position. When female member 56 is engaged on nipple 62, actuator 76 is pressed down closing the contacts of switch 74.

Switch 74 is connected to the power supply circuit of the electric motor driving table 18, in series with the motor.

During the installation of a tire, a wheel of a vehicle, generally indicated by the reference numeral 100 is mounted on table 18. Clamps 22 are actuated by the operator to firmly engage the inner wall 28 of wheel 100.

Table 18 is rotated and a tubeless tire 30 is loosely mounted on wheel 100 by the tire changing tool 16. To inflate the tire 30, the beads 32 of the tire must be seated firmly against the rim portions 34 of the wheel 100 for creating an adequate seal and preventing air to escape through the interfaces formed between the beads 32 and their respective rim portions 34 of the wheel. At that end, the operator connects the hose 25 to the header 38, by means of the quick connect/disconnect coupling 52 and also connects to the valve of the wheel a second compressed air line. By actuating the appropriate controls, air is injected in the tire by the valve of the wheel and simultaneously a high pressure air jet is injected from nozzles 46 toward the interface defined between the tire bead and the rim portion of the wheel, which are adjacent to table 18. A quantity of air penetrates within the tubeless tire 30 so as to create a pressure differential which will seat both tire beads 32 against their respective rim portions 34.

During the time hose 25 is connected to header 38, the contacts of switch 74 are in opened position, thus disabling the motor driving the table 18 and preventing the latter and the header 38 from being accidentally rotated. However, when the female member 56 is mounted on holder assembly 58, the switch 74 closes the power supply circuit of the motor and allows table 18 to be actuated by the operator.

If an accidental escape of highly pressurized air occurs, through hose 25, while it is connected to holder assembly 58, the pressure of the air will be greatly reduced by the steel ball 66, and the air will be directed downwardly, through discharge opening 61, reducing the risk of injuries.

Although the invention has been described with relation to a specific form, it will be evident for a person skilled in the art that it may be refined and modified in various ways. It is, therefore, wished to have it understood that the present invention should not be limited in interpretation except by the terms of the following claims.

I claim:

1. A tire changing machine comprising:
   a supporting structure;
   a rotatable table comprising a top surface for supporting a wheel and tire assembly thereon;
   an axle means for rotatably supporting said table to said supporting structure;
   means for rotating said table;
   wheel clamping means mounted on said table and being movable between a wheel clamping position and a wheel release position by a mechanism mounted below said table;
   a tire changing tool means mounted to said supporting structure; and
   a device for seating tire beads of a tubeless tire onto the rims of a wheel, said device including a conduit structure mounted to said table for rotating therewith, said conduit structure extending along a peripheral portion of said table below the top surface thereof and defining a central space for accommodating said mechanism, said conduit structure including:
   (a) an elongated header extending around said axle means and defining an opening through which extends said axle means, said elongated header being adapted to be connected to a source of compressed air; and
   (b) a plurality of upwardly extending conduits having each an end connected to said header and an opposite end passing through a respective opening in said table and defining an air discharge nozzle for injecting air toward the interface between a bead of said tire and a corresponding rim portion of a wheel.

2. A tire changing machine as defined in claim 1, further comprising means for preventing an accidental rotation of said table and said header when said header is connected to said source of compressed air.

3. A tire changing machine as defined in claim 2, further comprising a flexible hose having one end connected to said source of compressed air and an opposite end adapted to be connencted to said header by means of a quick connect/disconnect coupling.

4. A tire changing machine as defined in claim 3, wherein said table is driven by an electric motor powered through an electric circuit, said tire changing machine further including:
   a hose holder means mounted to said supporting structure and being adapted to receive said flexible hose; and
   a safety switch means mounted to said tire changing machine and being operatively connected to said circuit, wherein when said flexible hose is removed from said holder means said switch means opens said electric circuit.

5. A tire changing machine as defined in claim 4, wherein said hose holder comprises an elbow shaped conduit having at one end a nipple adapted to receive said opposite end of said flexible hose, said nipple including air pressure reducing means, said elbow shaped conduit further including at an opposite end thereof a downwardly extending air discharge opening.

6. A tire changing machine as defined in claim 1, wherein the cross-sectional area of each conduit diminishes toward the nozzle thereof to increase the velocity of the air emanating from the nozzle.

7. A tire changing machine as defined in claim 1, wherein said header has an annular shape.

8. A tire changing machine as defined in claim 7, wherein each of said conduits extends upwardly and radially outwardly with respect to said header, at a certain level between said header and said table each conduit makes a right angle bend radially inwardly with respect to said header.

9. A tire changing machine as defined in claim 1, wherein said header has a polygonal shape.

10. A tire changing machine comprising:

a supporting structure;

a rotatable table comprising a top surface for supporting a wheel and tire assembly thereon;

an axle means for rotatably supporting said table to said supporting structure;

means for rotating said table;

wheel clamping means mounted on said table and being movable between a wheel clamping position and a wheel release position by a mechanism mounted below said table;

a tire changing tool means mounted to said supporting structure; and a device for seating tire beads of a tubeless tire onto the rims of a wheel, said device including a conduit structure mounted to said table for rotating therewith, said conduit structure extending along a peripheral portion of said table below the top surface thereof and defining a central space for accommodating said mechanism, said conduit structure including:

(a) an elongated header extending around said axle means and defining an opening through which extends said axle means, said elongated header being adapted to be connected to a source of compressed air; and (b) a plurality of upwardly extending conduits having each an end connected to said header and an opposite end passing through a respective opening in said table and defining an air discharge nozzle for injecting air toward the interface between a bead of said tire and a corresponding rim portion of a wheel;

said air being directed from said compressed air source to said header through a flexible hose connected to said header by a releasable coupling, said machine further including:

a hose holder adapted to receive said hose and being adapted to be mounted on said tire changing machine;

switch means adapted to be mounted on said tire changing machine and being operatably connected to the drive system of the said table to prevent said table and said header from rotating when said hose is removed from said holder.

11. An assembly as defined in claim 10, wherein said table is driven by an electric motor powered through an electric circuit, said switch means being operatively connected to said electric circuit to open said circuit when said hose is removed from said holder.

12. An assembly as defined in claim 10, wherein said hose holder comprises an elbow shaped conduit having at one end a nipple adapted to receive an end of said flexible hose, said nipple including air pressure reducing means, said elbow shaped conduit further including at an opposite end thereof a downwardly extending air discharge opening.

* * * * *